Feb. 27, 1962 W. W. MARTIN 3,022,601
TROTLINE REEL
Filed May 1, 1961 2 Sheets-Sheet 1

INVENTOR.
WILFERD W. MARTIN
BY
*Fishburn & Gold*
ATTORNEYS

Feb. 27, 1962   W. W. MARTIN   3,022,601
TROTLINE REEL
Filed May 1, 1961   2 Sheets-Sheet 2
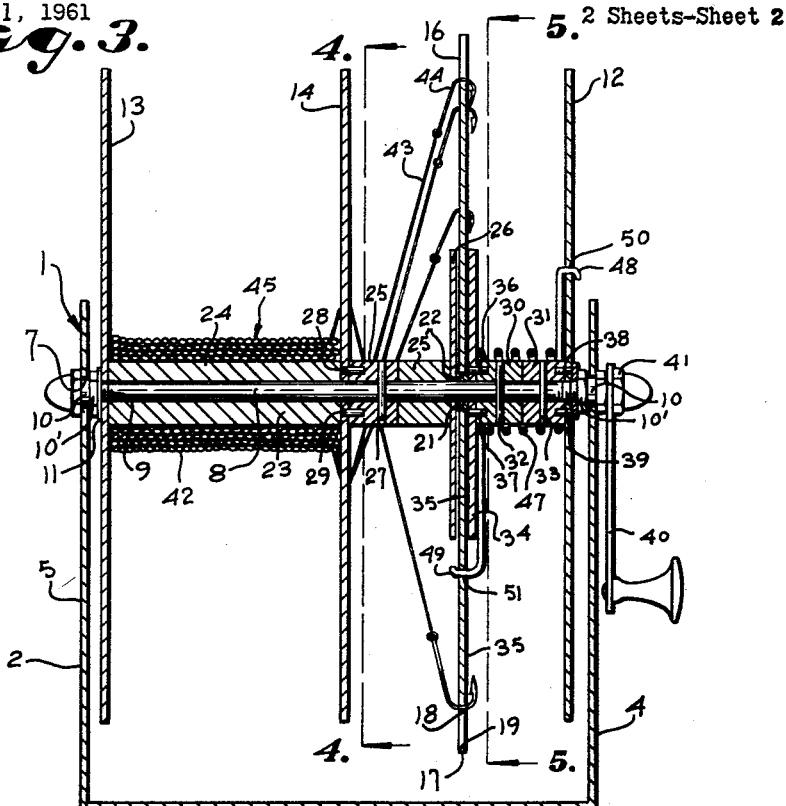
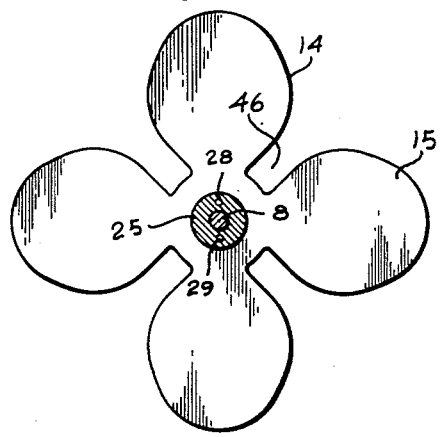
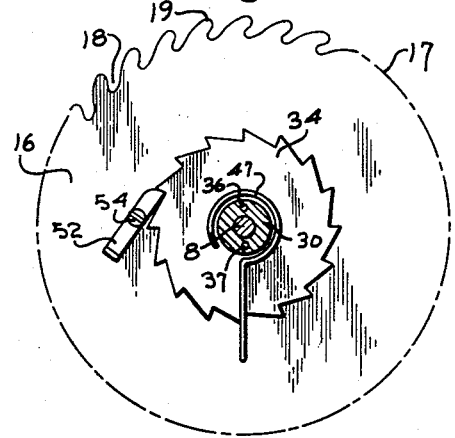
INVENTOR.
WILFERD W. MARTIN
BY
Fishburn & Gold
ATTORNEYS

United States Patent Office 3,022,601
Patented Feb. 27, 1962

3,022,601
TROTLINE REEL
Wilferd W. Martin, R.R. 3, Box 322, Liberty, Mo.
Filed May 1, 1961, Ser. No. 106,551
10 Claims. (Cl. 43—54.5)

This invention relates to a trotline reel, and more particularly to a reel for trotlines wherein the hooks on the staging line of a trotline may be engaged and held without becoming entangled with the line.

Heretofore, with trotlines of this character wherein the staging line or the line upon which the hook is attached, has been troublesome in keeping the hooks from entanglement with other staging lines and with the trotline itself.

In certain types of fishing, lines are used which are provided with a number of branch lines commonly called stage lines upon which hooks are secured to their free end and these stage lines or leader lines are spaced along the length of the trotlines. One end of the trotline is secured along the bank of a stream or lake, or other body of water, and usually by boat the line is spread across the body of water. Unless there is some apparatus for retaining the hooks in fixed position, they are very likely to become entangled and it is difficult to get them untangled and lay the line across the body of water.

Various attempts have been made to devise apparatus or reels for trotlines wherein the hooks would be engaged on the reel and unwound therefrom as the line is spread across the body of water, but none of such attempts have been successful as far as applicant is aware. Much time is lost in an attempt to untangle the trotline and during such work in untangling the boat in which the fisherman is attempting to lay the line from will drift with the current and the line is not laid in the positions desired.

It is the principal object of the present invention to provide a framework structure for mounting a shaft and means forming a drum upon which is wound a trotline and wherein there is provided a disk member on one side of the line having spaced blades and on the other side of the line is provided a blade having a plurality of notches or serrations wherein the hooks of the stage line may be placed thereon and the stage lines are in taut condition, and the trotline may be unwound therefrom by rowing or motoring of the boat across the body of water at any desired speed.

Other objects of the present invention are to provide a reel carried by the frame having a shaft therein and end plates or disks adjacent the ends of the frame; to provide a blade plate spaced from one of said end plates to form the drum and on which the trotline and stage lines are wound, said blade plate having a plurality of spaced blades thereon rounded at their outer ends; to provide a hook blade or plate spaced from said blade plate upon which the hooks are engaged and the stage lines extend between the blades on the blade plate to the winding drum of the reel; to provide a ratchet plate on the shaft adjacent the hook plate; to provide a pivoted pawl on the hook plate so that the end of the pawl may engage the ratchet plate; to provide a coil spring encircling the shaft between the end plate and the ratchet plate on the hook plate with one end of the coil spring engaging the end plate and the other end the hook plate to provide a tension on the hook plate to keep the stage line in taut condition by rotation of the hook plate with respect to the ratchet plate and fastening the pawl in engagement of the pawl with the ratchet plate.

Other objects of the present invention are to provide a sleeve member on the shaft having sections and means for securing the respective plates to said sections; to provide a bearing member for the hook plate on the shaft; to provide means for securing the ratchet plate to the shaft and to provide crank means on the shaft for rotating the reel to wind the line thereon; and to provide a device of this character simple and economical to manufacture.

Other objects and advantages of this invention will become apparent from the following description taken in connection with the accompanying drawings wherein are set forth by way of illustration and example certain embodiments of this invention.

FIG. 3 is a cross-sectional view through the reel.

FIG. 4 is a cross-sectional view taken on a line 4—4, FIG. 3.

FIG. 5 is a cross-sectional view taken on a line 5—5, FIG. 3.

Figure 2:
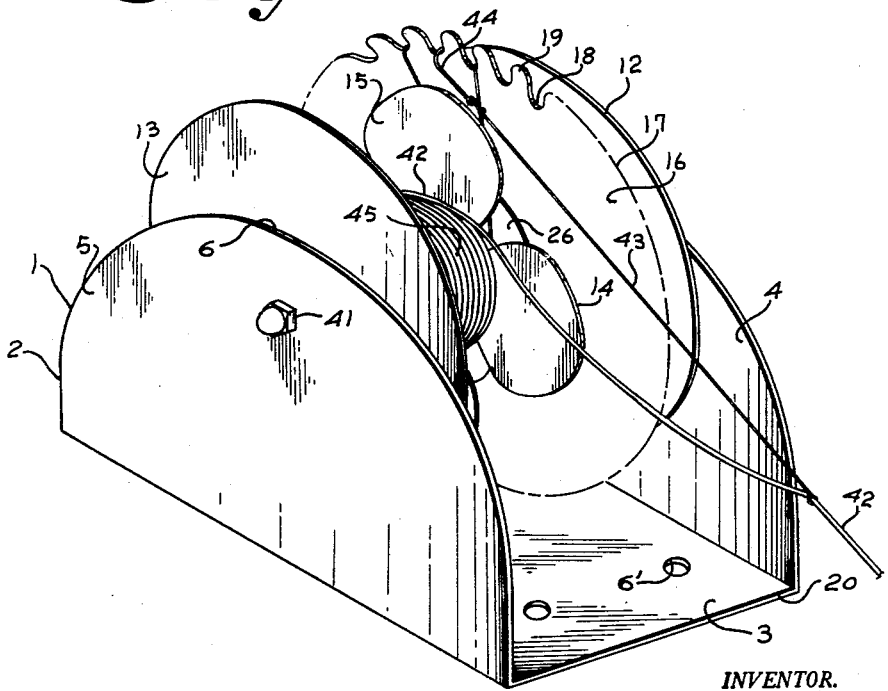
FIG. 2 is a perspective view of the trotline reel particularly illustrating the line with the stage line and hooks in place on the hook blade.

Referring more in detail to the drawings:

1 designates a reel embodying the features of my invention comprising a frame 2 of generally U-shape having a bottom 3 and ends 4 and 5, the upper edges being of generally rounded shape, as indicated at 6 (FIG. 2). The frame may be fastened to a support such as a boat or the like by screws (not shown) through openings as indicated at 6' (FIG. 2).

Spaced from the upper edge of the rounded surface 2 of the ends 4 and 5 are openings 7 for receiving the ends of a shaft 8. The ends of the shaft are threaded, as indicated at 9, and extend into a hub portion 10 of nuts 10' which engage in the opening 7 of the side plate to provide a bearing for the ends of the shaft. A washer 11 is provided between the nuts 10' and end disks 12 and 13 mounted on the shaft 8 adjacent the sides of the frame 4 and 5. The disk 13 is mounted on the shaft to rotate therewith. Mounted on the shaft 8 and spaced from the disk 13 is a disk or plate 14 having a plurality of spaced blades 15 thereon, as illustrated in FIG. 4, for a purpose later described.

Mounted on the shaft 8 and spaced from the blade plate 14 is a disk or blade 16 having its outer periphery 17 provided with a plurality of serrations 18 providing hooks 19 extending slightly at an angle away from the end 20 of the frame 2 also for a purpose later described. A bearing 21 is provided on the shaft and the blade 16 has an opening 22 which extends around the bearing so that the blade 16 may rotate on the shaft.

A sleeve member 23 is provided between the end disk 13 and plate 14 to form a drum 24 and spacers 25 and 25' are provided between the blade plate 14 and hook blade 16. A washer 26 is provided on the shaft between the spacer 25' and the hook blade 16, as illustrated in FIG. 3. A pin 27 secures the spacer 25 to the shaft 8 and transverse pins 28 and 29 secure the plate 14 to the spacer 25 so that the plate 14 will rotate with the shaft.

Spacers 30 and 31 are provided on the shaft 8 between the hook blade 16 and the end disk or plate 12 and are secured to the shaft 8 by pins 32 and 33. A ratchet plate 34 is carried by the shaft 8 and engages against the side face 35 of the hook blade 16 and is secured to the spacer member 30 by pins 36 and 37 so that the ratchet plate will rotate with the shaft. Pins 38 and 39 carried by the end plate 12 engage the spacer 31 so that the end plate will also rotate with the shaft. The shaft 8 extends outwardly from the end 4 of the frame and mounted thereon is a crank 40 for rotation of the reel portion of the device with respect to the frame. The crank is held on the shaft by a nut 41.

Figure 1:
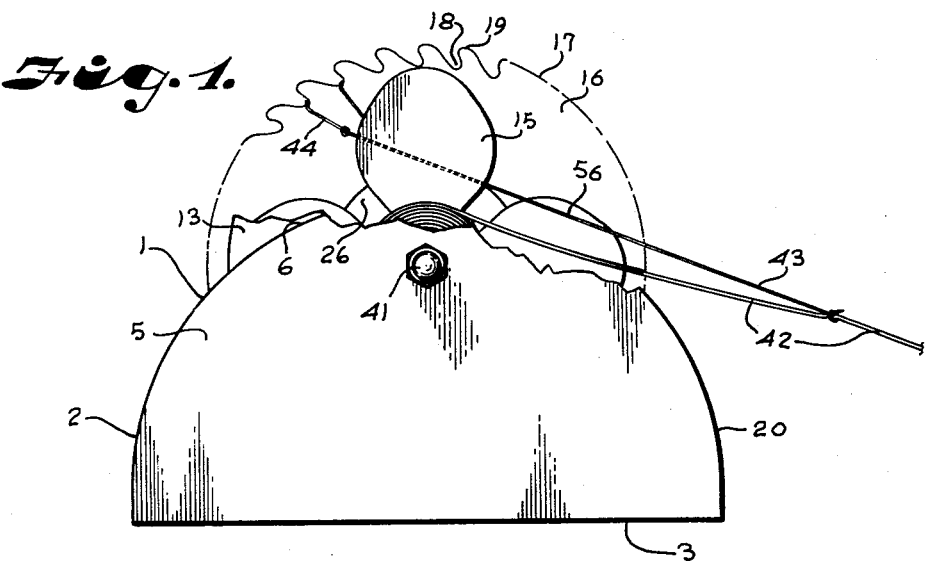
FIG. 1 is an end view of the trotline reel with parts broken away to better illustrate the invention.

A trotline 42 is illustrated in FIGS. 1 and 2 and when wound on the drum 24 has one end (not shown) secured to the drum 24. Spaced from the end of the trotline 42 are spaced stage or leader lines 43 having a hook 44 on the end thereof. These stage lines 43 are spaced approximately 9 feet apart on the trotline and as many stage lines can be carried on the trotline as desired within the limits of the laws of each state in which they are used.

In FIG. 3 there is illustrated a number of hooks on the hook blade 16 and shown in the space 46 between the blades 15 of the plate 14, so that both the line 42 and stage lines 43 respectively may be wound on the drum, as indicated at 45. When the end of the trotline is finally reached and all the hooks are on the hook blade then the reel may be moved to another setting or stored until the next use.

A coil spring 47 surrounds the spacers 30 and 31, as illustrated in FIG. 3, and each end thereof is provided with hooks 48 and 49. The hook 48 engaging in an opening 50 in the end disk 12 and the hook 49 engaging in an opening 51 in the hook blade 16 on opposite sides of the shaft 8 so that a tension at all times in a clockwise direction will be exerted on the hook blade 16 when viewed from the right side of the reel. A pawl 52 is secured to the side 35 of the hook blade by a set screw or the like 54 adapted to engage the ratchet wheel 34, as illustrated in FIG. 5.

In operation with the trotline wound on the reel portion, as indicated at 45 and the hooks 44 engaged on the various hook portions 19 of the blade 16, the frame may be secured to the back of a boat or a support on the boat so that the operator may operate the reel from the right side thereof. The free end of the line may be secured to a bank of a river or other body of water (not shown) and the boat moved out into the stream or body of water either by oars or by motor and the reel will be turning in a counter clockwise direction viewed from the right side, and as the stage lines are reached, the hooks 44 will be automatically disengaged from the hooks 19 on the hook blade 16 as the stage lines are reached. There is no limit within reason as to the speed of a boat in unwinding the trotline from the reel when the line is properly wound on the reel.

When the line is finally unwound, the end of the line secured to the shaft of the reel may be disengaged and secured to a support in any suitable manner.

The boat may then be moved alongside of the trotline and bait placed upon the individual hooks 44.

When it is desired to take up the trotline, one end thereof may be disengaged from its anchor or mooring and secured to the drum 24 of the shaft 8 and the trotline wound thereon by operation of the crank 40 in a clockwise direction. When the first stage line is reached by movement of the boat along the line, the hook is grasped and placed in one of the serrations 18, as indicated in FIG. 2, and the stage line 43 is kept in a taut condition. The hand of the operator will grasp the stage line and move it to the left, as shown in FIGS. 2 and 3, so that a blade 15 will pick up the stage line and move the same in the space 46 therebetween to be wound on the drum 24. While this proceeding is progressing, the trotline 42 may be slightly loose, but it is essential that the stage line be kept taut when winding on the reel. The operator then moves to the next stage line and the same procedure is followed until all of the hooks are in the serrations 18. The operator selects a serration 18 in which to place the hook when winding the line on the reel best suited for the stage line to engage a blade, as indicated at 56 (FIG. 1), to keep the stage line 43 taut.

It is essential that the stage lines 43 be kept taut while winding or unwinding the reel and even in storage when not in use. The spring 47 tends to keep tension on the stage lines in this respect. If additional tension is required on the line, the hook blade 16 may be rotated counter clockwise when viewed from the right to tighten the tension on the spring and the pawl 52 will engage the ratchet and hold the hook blade in this condition. The ratchet when engaged by the pawl keeps and retains the spring under tension while winding up the line. When unwinding the line the pawl is disengaged from the ratchet.

The trotline, as well as the stage lines, will shorten when wet and in order to keep the tension on the hook blade when the reel is not in use, the pawl 52 is disengaged from the ratchet wheel 34 so that as the line dries and tends to slacken, the hook blade will be rotated in a clockwise direction relative to the shaft by tension of the spring 47.

It will be obvious from the foregoing that I have provided an improved trotline reel, wherein the line and stage lines with hooks thereon may be wound and held in place on the reel in an efficient manner and wherein the line and stage lines may be unwound from the reel at any desired speed without danger or entanglement of the line, thus saving great time in laying the trotline and also in taking up the trotline and placing it on the reel in a manner to prevent entanglement of the line.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A reel for receiving a trotline having a plurality of stage lines spaced thereon provided with hooks comprising, a frame, a shaft rotatably mounted on said frame, said reel including at least one end disk on said shaft, means on said shaft spaced from said end disk and rotatable with said shaft for forming a line receiving drum therebetween, a blade on said shaft and rotatable therewith spaced from said first named means, means on said blade for receiving the hooks on said stage lines, means for rotating said shaft, and means on said first named means for picking up said stage lines and winding the same on said drum with the trotline as the hooks are consecutively secured to said means on said blade for receiving the same.

2. A reel for receiving a trotline having a plurality of stage lines spaced thereon provided with hooks comprising, a frame, a shaft rotatably mounted on said frame, said reel including at least one end disk on said shaft, means on said shaft spaced from said end disk and rotatable with said shaft for forming a line receiving drum therebetween, a blade on said shaft and rotatable therewith spaced from said first named means, means on said blade for receiving the hooks on said stage lines, means for rotating said shaft, means on said first named means for picking up said stage lines and winding the same on said drum as the hooks are consecutively secured to said means on said blade for receiving the same, and means on said shaft engaging said blade for retaining said stage lines in taut condition on said reel.

3. A reel for receiving a trotline having a plurality of stage lines spaced thereon provided with hooks comprising, a frame, a shaft rotatably mounted on said frame, said reel including end disks on said shaft, means on said shaft spaced from one of said end disks and rotatable with said shaft for forming a line receiving drum therebetween, a blade on said shaft and rotatable therewith spaced from said first named means, means on said blade for receiving the hooks on said stage lines, means for rotating said shaft, and means on said first named means for picking up said stage line and winding the same on said drum with said trotline as the hooks are consecutively secured to said means on said blade for receiving the same, and means engaging one of said end disks and said blade for retaining said stage lines in taut condition on said reel.

4. A reel for receiving a trotline having a plurality of stage lines spaced thereon provided with hooks comprising, a frame, a shaft rotatably mounted on said frame, said reel including end disks on said shaft, means on said shaft spaced from one of said end disks and rotatable with said shaft for forming a line receiving drum therebetween, a blade on said shaft and rotatable therewith spaced from said first named means, means on said blade for receiving the hooks on said stage lines, means for rotating said shaft, and means on said first named means for picking up said stage lines and winding the same on said drum with said trotline as the hooks are consecutively secured to said means on said blade for receiving the same, and spring means on said shaft having one end engaging one of said end disks and the other end engaging said blade for retaining said stage lines in taut condition on said reel.

5. A reel for receiving a trotline, having a plurality of stage lines spaced thereon provided with hooks comprising, a frame, a shaft rotatably mounted on said frame, said reel including end disks on said shaft, a disk on said shaft having spaced blades, said disk being spaced from one of said end disks and rotatable with said shaft for forming a line receiving drum therebetween, a blade on said shaft and rotatable therewith spaced from said disk, said blade having a plurality of hooks around the periphery thereof for receiving the hooks on said stage lines, means for rotating said shaft, said blades on said disk picking up said stage lines and winding the same on said drum with said trotline as the hooks are consecutively secured to said hooks on said blade, and means engaging one of said end disks and said blade for retaining said stage lines in taut condition on said reel.

6. A reel for receiving a trotline having a plurality of stage lines spaced thereon provided with hooks comprising, a frame, a shaft rotatably mounted on said frame, said reel including end disks on said shaft, a disk on said shaft having spaced blades, said disk being spaced from one of said end disks and rotatable with said shaft for forming a line receiving drum therebetween, a blade on said shaft and rotatable therewith spaced from said disk, said blade having a plurality of hooks around the periphery thereof for receiving the hooks on said stage lines, means for rotating said shaft, said blades on said disk picking up said stage lines and winding the same on said drum with said trotline as the hooks are consecutively secured to said hooks on said blade, and a coil spring surrounding the shaft having one end engaging one of the end disks and its other end engaging said blade for exerting pressure on said blade for retaining said stage lines in taut condition on said reel.

7. A reel for receiving a trotline having a plurality of stage lines spaced thereon provided with hooks comprising, a frame, a shaft rotatably mounted on said frame, said reel including end disks on said shaft, means on said shaft spaced from one of said end disks and rotatable with said shaft for forming a line receiving drum therebetween, a blade on said shaft and rotatable therewith spaced from said first named means, means on said blade for receiving the hooks on said stage lines, means for rotating said shaft, means on said first named means for picking up said stage lines and trotline and winding the same on said drum as the hooks are consecutively secured to said means on said blade for receiving the same, a ratchet plated on said shaft and rotatable therewith, adjacent said blade, a pawl on said blade for engaging said ratchet plate whereby said blade may be rotated on said shaft while the ratchet is stationary for tightening said stage lines and for retaining said stage lines in taut condition on said drum.

8. A reel for receiving a trotline having a plurality of stage lines spaced thereon provided with hooks comprising, a frame, a shaft rotatably mounted on said frame, said reel including end disks on said shaft, means on said shaft spaced from one of said end disks and rotatable with said shaft for forming a line receiving drum therebetween, a blade on said shaft and rotatable therewith spaced from said first named means, means on said blade for receiving the hooks on said stage lines, means for rotating said shaft, means on said first named means for picking up said stage lines and trotline and winding the same on said drum as the hooks are consecutively secured to said means on said blade for receiving the same, a ratchet plated on said shaft and rotatable therewith, adjacent said blade, a pawl on said blade for engaging said ratchet plate whereby said blade may be rotated on said shaft while the ratchet is stationary, and means engaging one of said end disks and said blade for retaining said stage lines in taut condition on said drum when said pawl is disengaged from said ratchet plate.

9. A reel for receiving a trotline having a plurality of stage lines spaced thereon provided with hooks comprising, a frame, a shaft rotatably mounted on said frame, said reel including end disks on said shaft, means on said shaft spaced from one of said end disks and rotatable with said shaft for forming a line receiving drum therebetween, a blade on said shaft and rotatable therewith spaced from said first named means, means on said blade for receiving the hooks on said stage lines, means for rotating said shaft, means on said first named means for picking up said stage lines and trotline and winding the same on said drum as the hooks are consecutively secured to said means on said blade for receiving the same, a ratchet plated on said shaft and rotatable therewith, adjacent said blade, a pawl on said blade for engaging said ratchet plate whereby said blade may be rotated on said shaft while the ratchet is stationary for tightening said stage lines and for retaining said stage lines in taut condition on said drum, and a coil spring on said shaft between one of said end disks and said ratchet plate having one of its ends secured to said end disk and its other end secured to said blade for retaining said stage lines in taut condition on said drum when said pawl is disengaged from said ratchet plate.

10. A reel for receiving a trotline having a plurality of stage lines spaced thereon provided with hooks comprising, a frame, a shaft rotatably mounted on said frame, said reel including end disks on said shaft, means on said shaft spaced from one of said end disks and rotatable with said shaft for forming a line receiving drum therebetween, a blade on said shaft and rotatable therewith spaced from said first named means, spaced hooks on the periphery of said blade for receiving the hooks on said stage lines, means for rotating said shaft, means on said first named means for picking up said stage lines and trotline and winding the same on said drum as the hooks are consecutively secured to said means on said blade for receiving the same, a ratchet plated on said shaft and rotatable therewith, adjacent said blade, a pawl on said blade for engaging said ratchet plate whereby said blade may be rotated on said shaft while the ratchet is stationary for tightening said stage lines and retaining said stage lines in taut condition on said drum, and a coil spring on said shaft between one of said end disks and said ratchet plate having one of its ends secured to said end disk and its other end secured to said blade for retaining said stage lines in taut condition on said drum when said pawl is disengaged from said ratchet plate.

References Cited in the file of this patent

UNITED STATES PATENTS

| 2,531,816 | Homoky | Nov. 28, 1950 |
| 2,629,197 | Duvall | Feb. 24, 1953 |

FOREIGN PATENTS

| 53,408 | Sweden | Jan. 10, 1923 |